Nov. 26, 1957     J. D. BROWN     2,814,318
FRAME FOR BAND SAWS
Filed Jan. 27, 1955     7 Sheets-Sheet 1
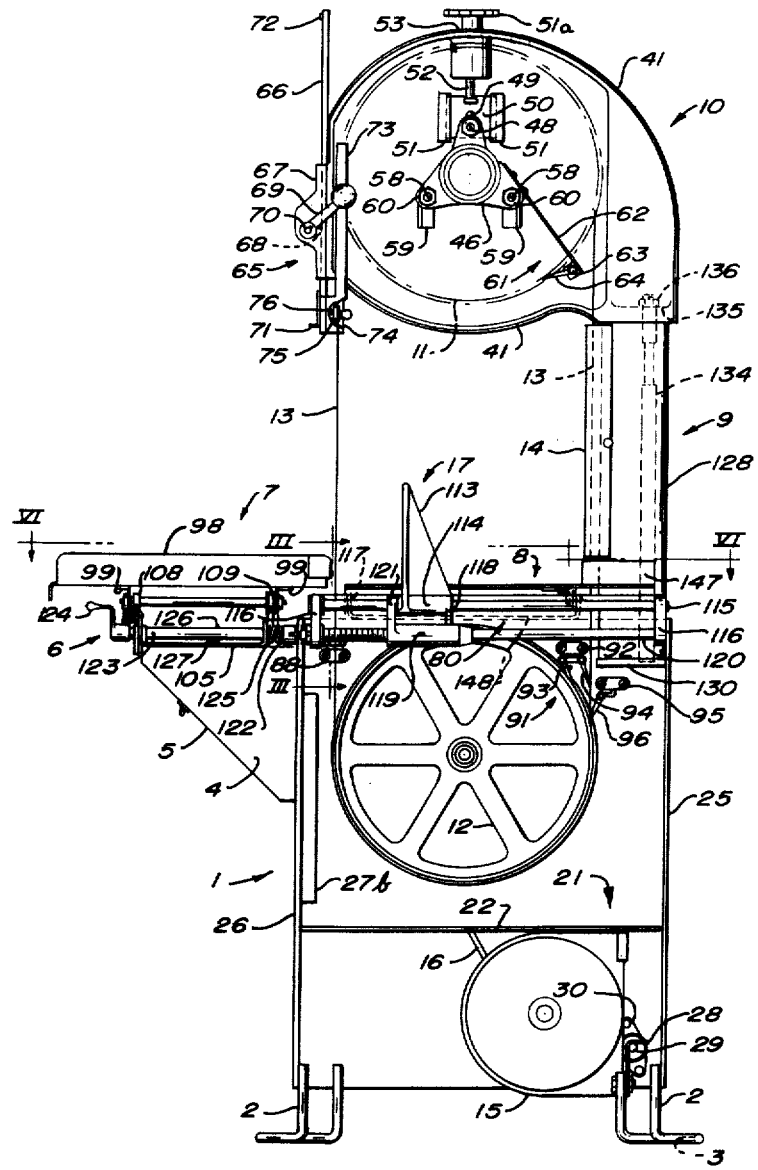
Fig. I
INVENTOR.
JAMES D. BROWN
BY
Marshall, Marshall & Yeasting
ATTORNEYS

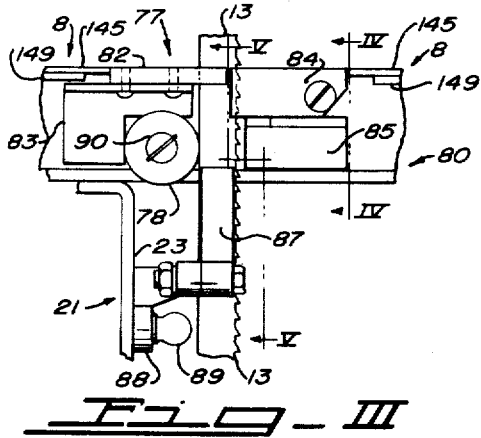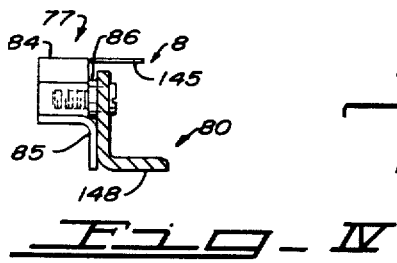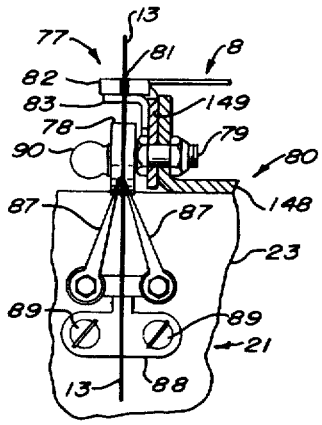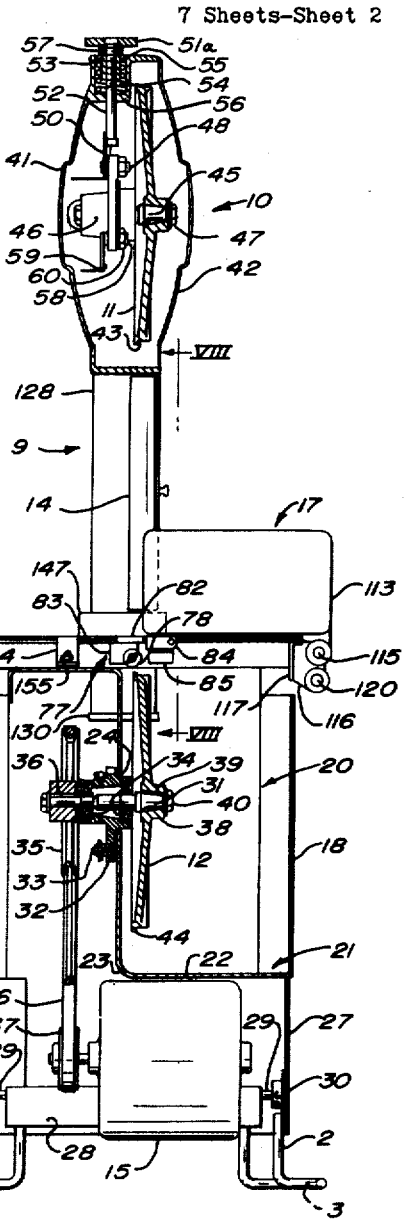

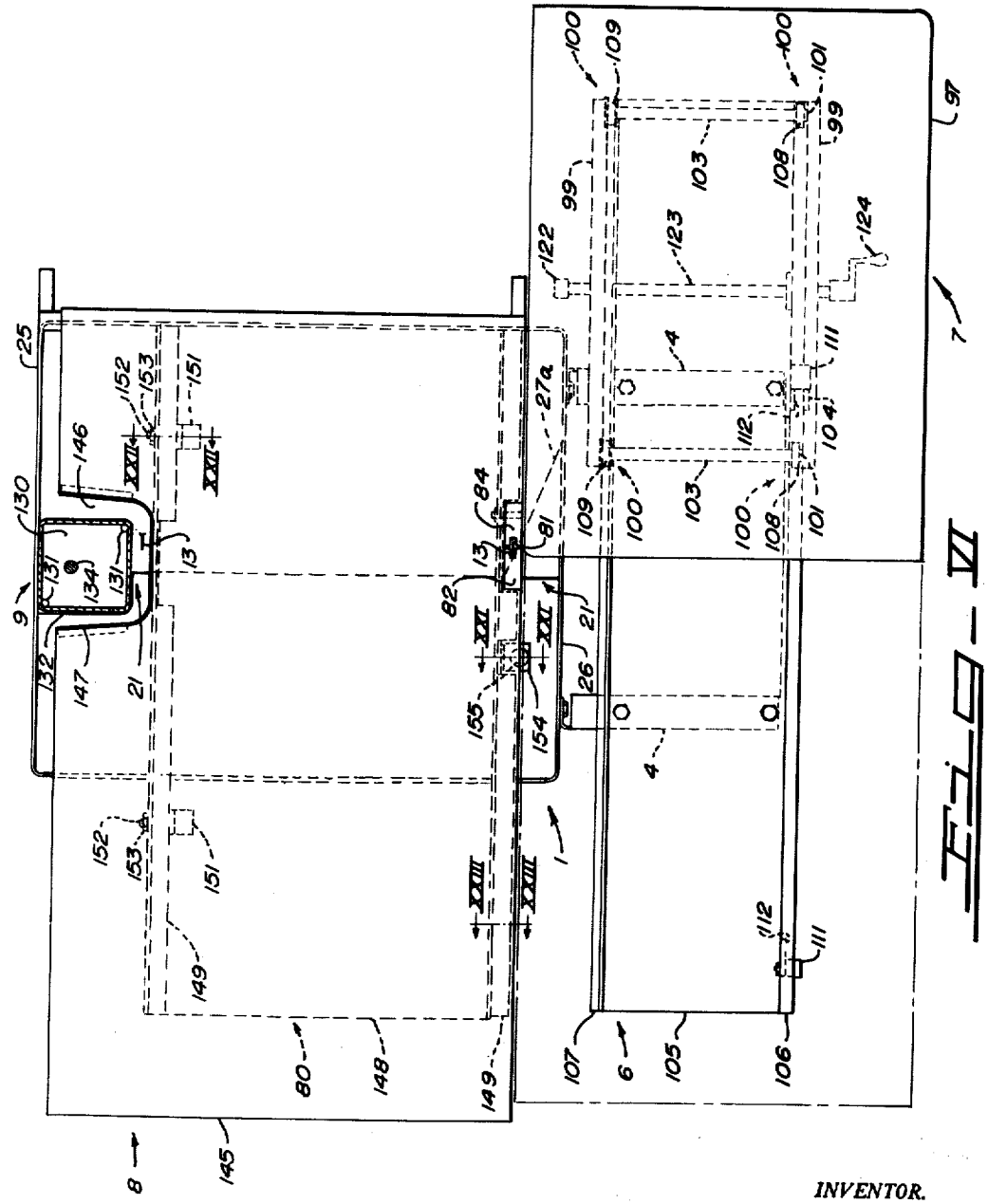

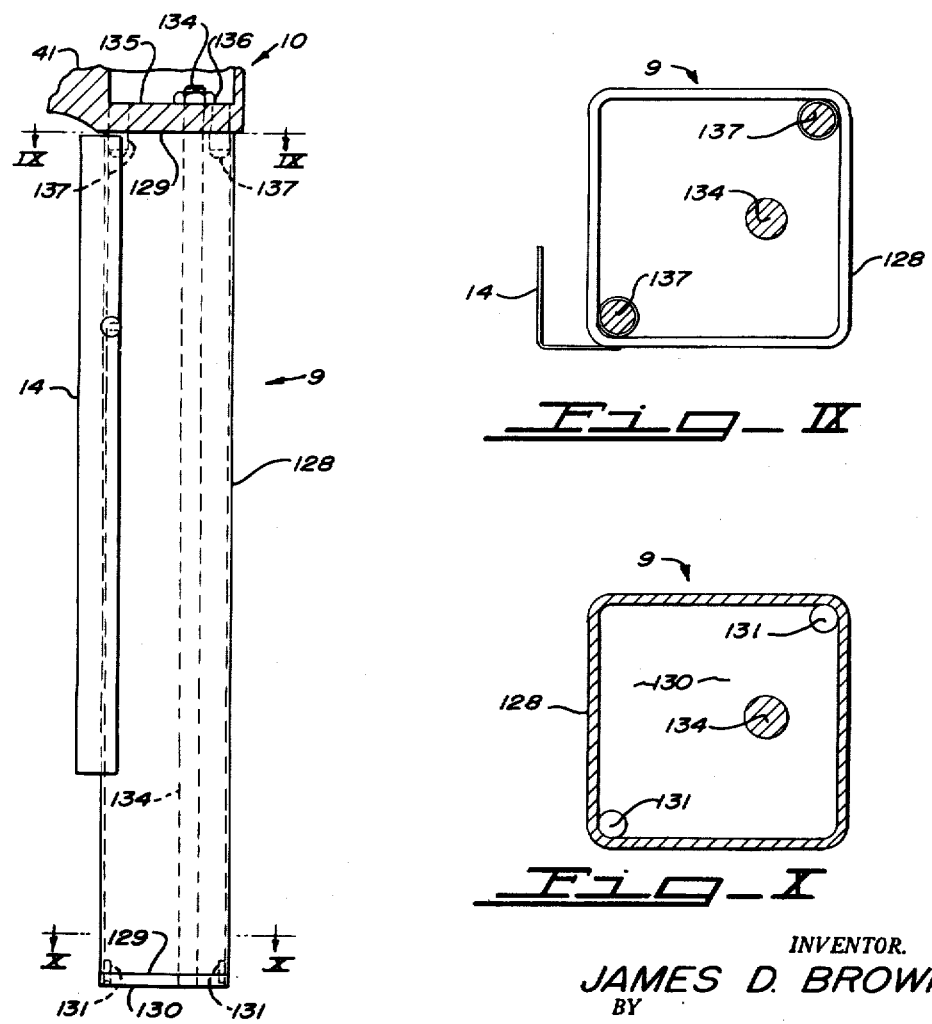

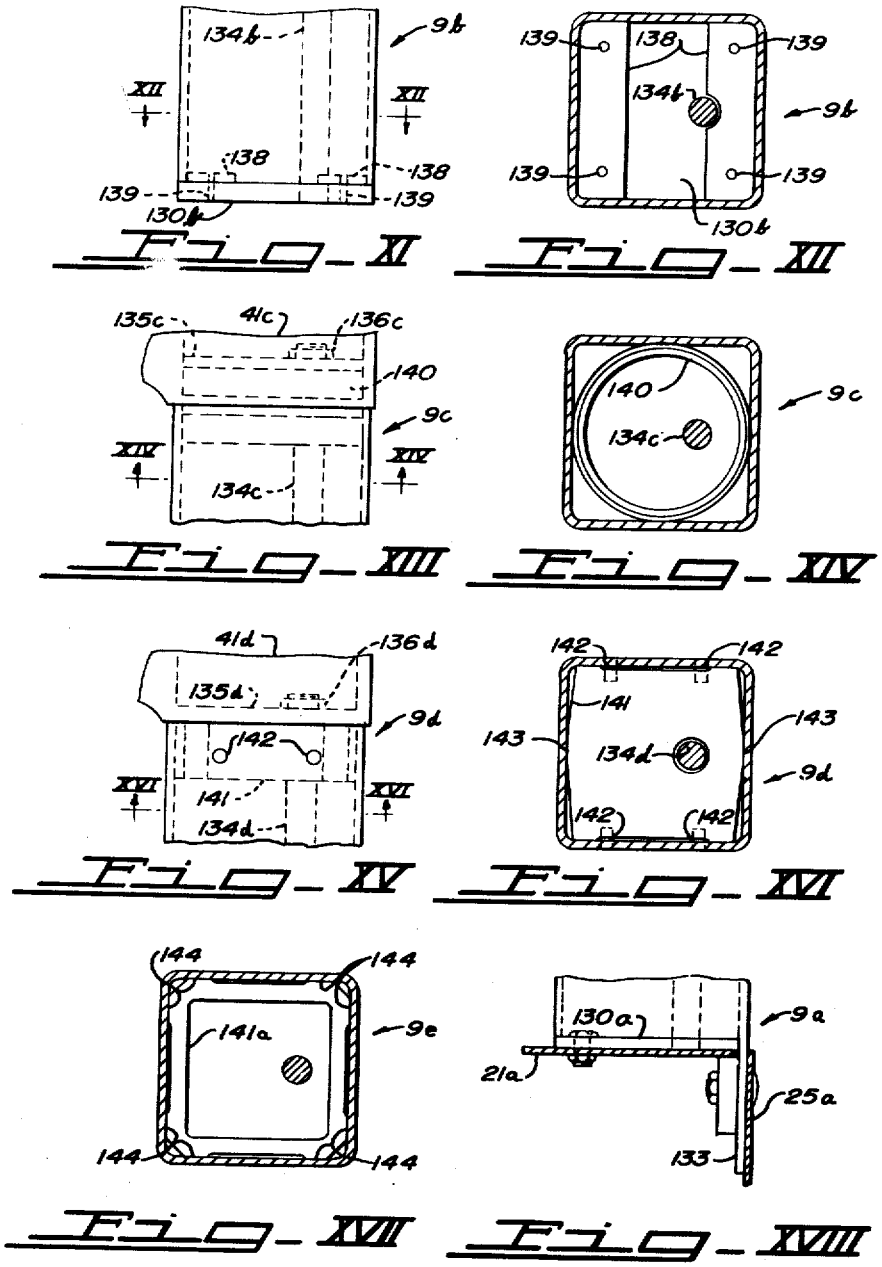

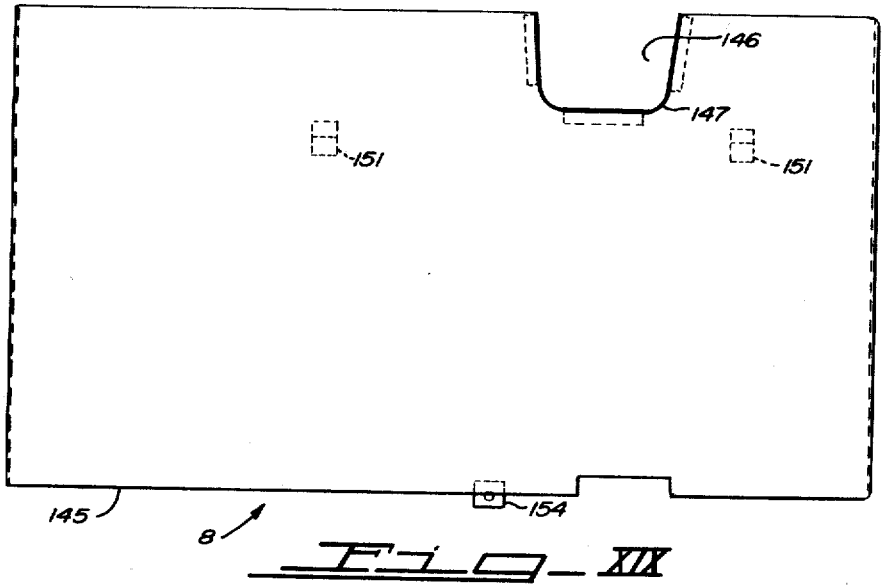
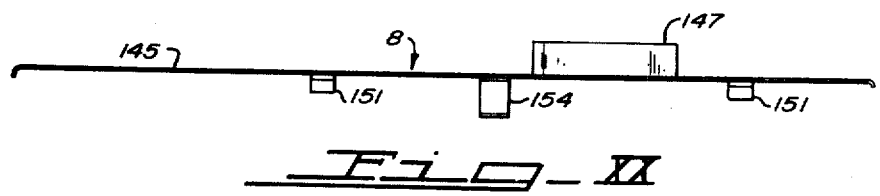
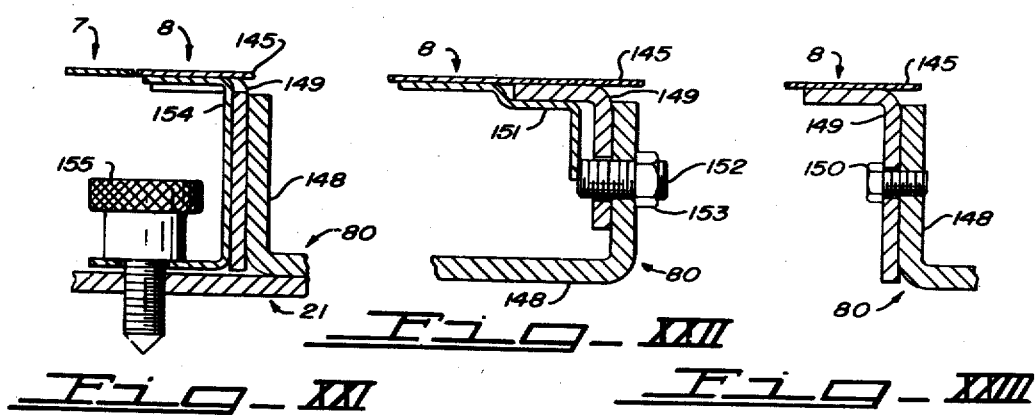

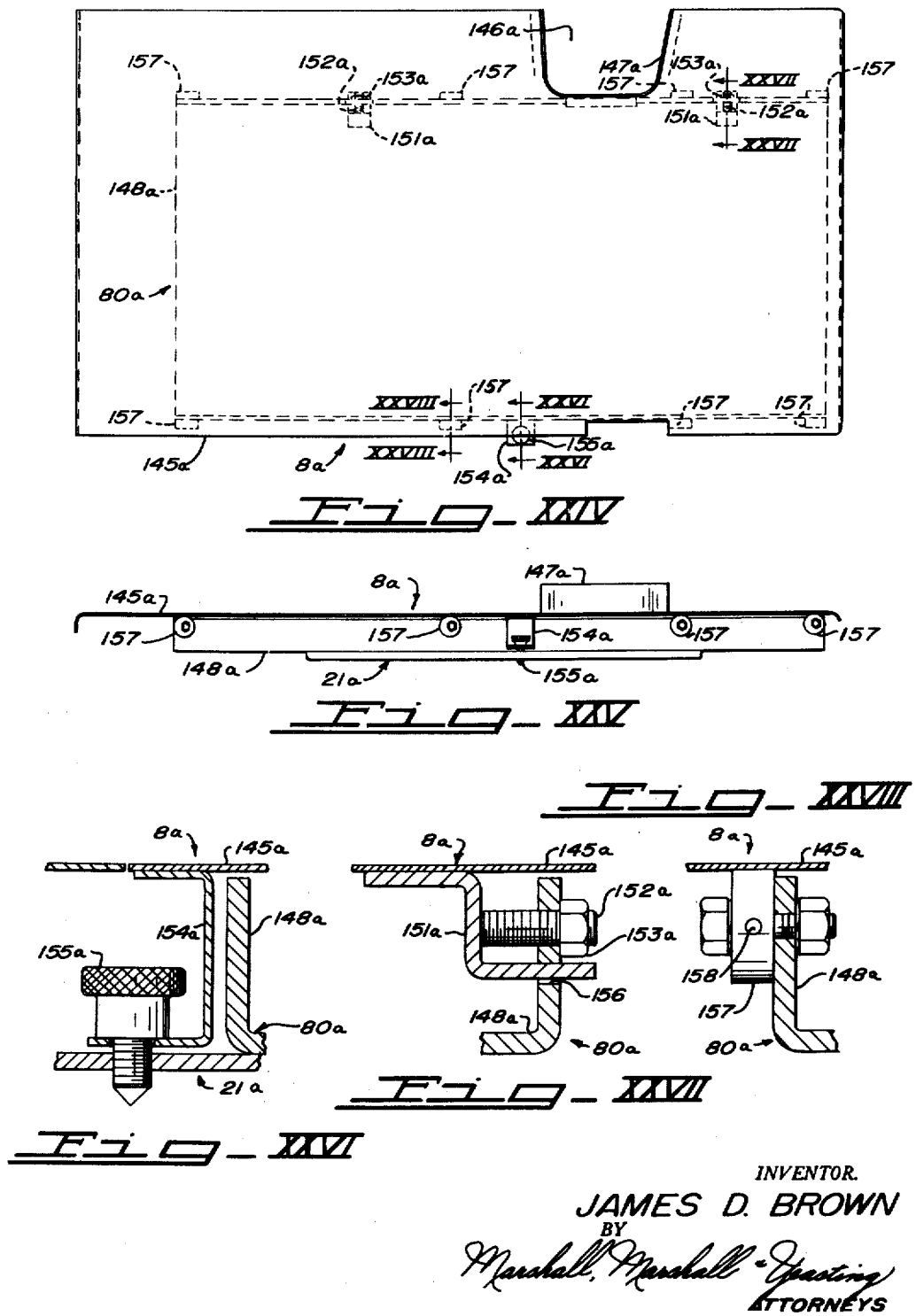

United States Patent Office 2,814,318
Patented Nov. 26, 1957

2,814,318

FRAME FOR BAND SAWS

James D. Brown, Toledo, Ohio, assignor to Toledo Scale Company, Toledo, Ohio, a corporation of New Jersey Application January 27, 1955, Serial No. 484,369

13 Claims. (Cl. 143—17)

This invention relates generally to improvements in meat cutting band saws of the type employed in places where large quantities of meat are cut from carcass or part carcass pieces.

The principal object of this invention is to provide a meat cutting band saw having improved operating characteristics yet being of very low cost construction.

Another object of this invention is to provide, in a meat cutting band saw, an extremely rigid column for supporting a saw wheel housing, the column having open ends whereby it may be made from flat stock by bending to reduce the cost of manufacture.

Another object of the invention is to provide, in a meat cutting band saw, a non-binding and easily movable table for supporting the main piece of meat in such a manner as to enable it to be moved past a saw blade, the movable table and the support therefor being of low cost construction.

Still another object of the invention is to provide, in a meat cutting band saw, a stationary work table which is very easily removable from and positionable on a supporting base housing and so shaped as to permit easy removal and replacement of a band saw blade, the stationary table and the support therefor being of low cost construction.

More specific objects and advantages are apparent from the following description of preferred embodiments of the invention.

According to the invention, a meat cutting band saw is provided with a hollow vertically upstanding column erected from a base housing. The column is made from flat stock by bending and rigidly supports a saw wheel housing. The base housing has a partially open top covered by a stationary work table removably clipped on its one side to a support and releasably locked on its other side to the base housing, the table being so shaped as to permit easy removal and replacement of a band saw blade. A movable table is also supported by the base housing and is so constructed that it does not bind as it moves the main piece of meat past a saw blade. The column and the tables are so constructed and the general arrangement of the parts of the machine is such as to greatly reduce the cost of manufacture of the improved meat cutting band saw.

Preferred embodiments of the invention are illustrated in the accompanying drawings:

In the drawings:

Figure I is an end elevation view of a meat cutting band saw embodying the invention, certain adjuncts being removed to reveal inner parts.

Figure II is a vertical sectional view showing the general construction of the machine illustrated in Figure I.

Figure III is a fragmentary enlarged detailed view taken substantially from the position shown by the line III—III of Figure I.

Figure IV is a vertical sectional view taken substantially along the line IV—IV of Figure III.

Figure V is a vertical sectional view taken substantially along the line V—V of Figure III.

Figure VI is a plan view taken substantially from the position shown by the line VI—VI of Figure I, parts being shown in section.

Figure VII is an enlarged detailed end elevational view of a movable table as seen from the same position as the table is viewed in Figure I, parts being shown in section.

Figure VIII is an enlarged end elevational view of the column taken substantially from the position shown by the line VIII—VIII of Figure II, the part of the saw wheel housing which is attached to the top of the column being shown in section.

Figure IX is a horizontal sectional view taken along the line IX—IX of Figure VIII.

Figure X is a horizontal sectional view taken along the line X—X of Figure VIII.

Figure XI is a fragmentary end elevational view of the lower end of a modified column, the view being similar to the lower part of Figure VIII.

Figure XII—XII is a horizontal sectional view taken along the line XII—XII of Figure XI.

Figure XIII is a fragmentary end elevational view of the upper end of a modified column, the view being similar to the upper part of Figure VIII.

Figure XIV is a horizontal sectional view taken along the line XIV—XIV of Figure XIII.

Figure XV is a fragmentary end elevational view of the upper end of another modified column, the view being similar to the upper part of Figure VIII.

Figure XVI is a horizontal sectional view taken along the line XVI—XVI of Figure XV.

Figure XVII is a horizontal sectional view similar to Figure XVI showing still another modified column.

Figure XVIII is a fragmentary end elevational view of the lower end of another modified column showing the support to which the column is attached in section.

Figure XIX is a plan view of a stationary table taken substantially from the position shown by the line VI—VI of Figure I.

Figure XX is a front elevational view of the stationary table illustrated in Figure XIX.

Figure XXI is a vertical sectional view taken along the line XXI—XXI of Figure VI.

Figure XXII is a vertical sectional view taken along the line XXII—XXII of Figure VI.

Figure XXIII is a vertical sectional view taken along the line XXIII—XXIII of Figure VI.

Figure XXIV is a plan view of a modified stationary table and a support therefor, the view being similar to that part of Figure V illustrating a stationary table.

Figure XXV is a front elevational view of the stationary table and the support therefor shown in Figure XXIV.

Figure XXVI is a vertical sectional view taken along the line XXVI—XXVI of Figure XXIV.

Figure XXVII is a vertical sectional view taken along the line XXVII—XXVII of Figure XXIV.

Figure XXVIII is a vertical sectional view taken along the line XXVIII—XXVIII of Figure XXIV.

The specific figures and the accompanying description are intended merely to illustrate the invention and not to limit its scope.

The meat cutting band saw generally illustrated in Figures I and II has a base housing 1 erected on four short legs 2 two of which have leveling nuts 3 parallel with the bottom surfaces of the legs. Forwardly supporting bracket members 4, both of which are shown in Figure VI, interconnected by means of a plate 5, are fixed to the base housing 1 and carry a pair of tracks 6 on which a movable table 7 is mounted to reciprocate. The top of the base housing 1 is formed by a stationary table 8 which lies on the same plane as the movable table 7 forming with the movable table a working surface for handling the meat to be cut on the machine.

At the rear center portion of the base housing 1 there is erected a hollow vertically upstanding column 9 atop which is located a saw wheel housing 10. An upper saw wheel 11 is rotatably mounted in the saw wheel housing 10 and a lower saw wheel 12 is rotatably mounted in the base housing 1, the saw wheels 11 and 12 being identical and preferably of the crown grooved type. A continuous band saw blade 13 runs on the saw wheels 11 and 12 passing upwardly near the outer front surface of the column 9 and downwardly across a throat formed between the underside of the saw wheel housing 10 and the stationary table 8. The rearward stretch of the band saw blade 13 is enclosed by a saw guard 14 attached to the column 9. A driving motor 15 is mounted in the base housing 1 and is drivingly connected to the lower saw wheel 12 by a drive belt 16. A thickness gauge plate 17 is mounted for fore and aft movement along the right hand side of the stationary table 8 back of the cutting plane of the blade 13 so that by setting the position of the gauge plate 17 relative to the blade 13 slices of meat of desired thickness can be cut.

The base housing 1 is constructed of sheet metal sections welded into a rectilinear hollow body. The upper right side of the base housing 1 is closed by an access door 18 and the upper left side of the base housing is closed by an access door 19 (Figure II). Opening of the doors gives access to the interior of the base housing 1 which is compartmented. At the upper right hand portion of the base housing 1 there is located a wheel compartment 20 (Figure II) formed of a Z-shaped section 21 having a flat bottom 22 and an inside wall 23 in which is cut a circularly shaped opening 24 and to which Z-shaped section 21 is attached, a rectangularly shaped back plate 25 and a similarly shaped front plate 26 (Figure 1) forming the back and front sides of the base housing 1. One of the four legs 2 is attached to each of the lower corners of the back plate 25 and one of the legs is attached to each of the lower corners of the front plate 26, as shown in Figure I, there being additional sections 27 interconnecting the lower portions of the plates 25 and 26 and attached to the legs, as shown in Figure II. A triangularly shaped plate 27a is fixed in the corner formed by the top of the Z-shaped section 21 and the top of the front plate 26, as shown in Figure VI, and a member 27b having a triangular cross section is fixed vertically along the inside of the front plate 26, as shown in Figure I.

The remainder of the interior of the base housing 1 constitutes a single compartment containing the driving motor 15 and its mounting means. The motor 15 is attached to an L-shaped member 28 having a pin 29 extending from each of its ends, which pins 29 are probably and resiliently supported in motor mounting brackets 30 attached one to each of the sections 27 of the base housing 1. The rockable and resilient mounting of the motor 15 provides means for loosening the drive belt 16 when it is to be removed, allows the motor to rock when, for example, it is first started up, and permits the weight of the motor to tension the drive belt 16.

The lower saw wheel 12 is removably mounted on the beveled end of an axle 31 extending through a horizontal bore of a casting 32 tiltably attached to the wall 23 of the Z-shaped section 21 by means of three jack screws 33, one of which is shown, which casting 32 extends through the opening 24 in the Z-shaped section. The axle 31 is journaled in the casting 32 by a pair of bearings 34 one of which is located at each end of the bore and mounts a V-belt pulley 35 on its end remote from the saw wheel 12, which pulley 35 is keyed to the axle by a key 36. A drive pulley 37 is mounted on the end of the shaft of the motor 15 and the drive belt 16 is drivingly engaged with that pulley and with the V-belt pulley 35. The lower saw wheel 12 has a hub 38 beveled to fit over the beveled portion of the axle 31, is keyed to the axle by a key 39, and is retained on the axle by means of a nut 40.

The saw wheel housing 10 includes a head 41 enclosing the upper saw wheel 11 and its mounting mechanism, the housing being provided with a suitable cover 42 (Figure II) which may be hinged or otherwise movably secured upon the housing so as to permit ready access to the interior for the operations of removing and replacement of the band saw blade 13 and for ready cleaning of the saw wheel and the housing.

The upper and lower saw wheels 11 and 12 are provided upon their outer peripheries with shallow flanges 43 and 44, respectively, against which flanges the rear edge of the band saw 13 may bear, the upper saw wheel 11 being mounted upon an axle 45 rotatably mounted in a bearing housing 46 and retained on the axle by a nut 47. The lower saw wheel 12, as has been hereinbefore described, is journaled within the base housing 1 so that its axle 31 can be tilted by turning the jack screws 33 to make it run true, but during operation the axle 31 is not translatable. Therefore, in order to apply the proper tension to the saw blade 13 and to accommodate blades of slightly different lengths, as, for example, when a blade has been broken and rewelded, the upper saw wheel 11 and its axle 45 are supported so that they can be both tilted and moved vertically. Mere ability to be moved, however, is insufficient because in order for the saw blade to operate properly it must be under a certain predetermined tension regardless of its length. The saw blade must be kept taut to maintain it in true running position on the peripheries of the saw wheels and also to prevent its being kinked or twisted when heavy pieces of meat or bone are pressed against its cutting edge during the cutting operations. The peripheries of the saw wheels preferably have a bevel at their forward edges to accommodate the teeth of the saw, which are "set" slightly. The flanges 43 and 44 at the rear of the peripheries prevent the saw blade from being run off a wheel when pressure is exerted against it during a cutting operation.

So that the upper saw wheel 11 and its axle 45 can be both tilted and moved vertically, and so that the saw blade 13 can be subjected to a certain predetermined tension, the bearing housing 46 is hung by means of a hanger jack screw 48 from a vertically extending slot 49 in a hanger plate 50 having edges vertically slidable in a pair of closed tracks 51 formed integrally with the head 41. The engagement of the hanger plate 50 in the tracks 51 prevents any substantial forward or rearward movement of the hanger plate. The bearing housing 46 is moved up and down in the tracks 51 by turning an adjusting knob 51a engaging the exposed end of a bolt 52 extending through an aperture 53 in the top of the head 41, the lower or head end of the bolt being attached to the hanger plate 50. A coil spring 54 surrounds the top portion of the bolt 52 and is compressed between a washer 55 and an integrally formed, cup-shaped section 56 of the head 41. When the adjusting knob 51a is tightened, a shoulder 57 on the knob forces the washer 55 downward compressing the coil 54 and at the same time the bolt 52 moves the hanger plate 50 and its attached bearing housing 46 upward tightening the saw blade 13 until the tension exerted on the blade is equal to the force required to compress the coil 54. Thereafter, any additional tightening of the adjusting knob 51a compresses the coil 54 without further movement being imparted to the bearing housing 46. By selecting the coil 54 of desired strength, the tension which will be exerted upon the saw blade 13 will be maintained at a fixed value. To indicate to a person operating the machine when the adjusting knob 51a has been tightened sufficiently to exert this predetermined tension upon the saw blade 13, the washer 55 is selected of a thickness which will cause the top surface of the washer to be even with the top surface of the head 41 when the predetermined tension is exerted. When the adjusting knob 51a is loosened, the bearing housing 46 moves downwardly, thereby loosening the saw blade 13 and permitting its ready removal and replacement.

The lower portion of the bearing housing 46 is provided with a pair of adjusting screws 58 guided in open tracks 59 formed integrally with the head 41 and preventing sidewise movement of the bearing housing 46. The open tracks 59, however, permit a forward and backward movement of the lower portion of the bearing housing 46 so that the housing 46 may be rocked about an axis defined by the hanger jack screw 48. By adjusting the screws 58 inwardly and outwardly with respect to the bearing housing 46, the axis of rotation of the axle 45 may be adjusted until it is parallel to the axis of rotation of the fixed lower saw wheel 12. The parallel relationship is maintained by locking the adjusting screws 58 in position by cooperating lock nuts 60.

The bearing housing 46 carries an upper saw wheel scraper 61 for the purpose of removing accumulated grease from the periphery of the upper saw wheel 11 to reduce the tendency of the saw blade 13 to slip on the wheel and to aid in keeping the machine clean. The upper wheel scraper 61 comprises an arm 62 attached to the bearing housing 46, a bracket 63 fixed to the free end of the arm 62, and a thin flexible blade 64, preferably made of molded nylon, so adjusting mounted in the bracket 63 that the free end of the blade 64 is forced against the periphery of the upper saw wheel 11.

The span of the saw blade 13 which crosses the open throat of the machine is dangerous because the saw moves at an extremely high speed. It is desirable, therefore, that only that portion of the saw actually required to pass through the particular piece of meat being cut should be exposed because of the possibility that the operator's hand or arm may be injured by contacting the saw blade above the meat being cut. In order to guard that portion of the blade not required and also in order to provide backing means for the blade as close to the meat being cut as possible, the machine is equipped with a saw guard and upper saw guide 65. The saw guard and guide 65 is mounted to slide vertically by means of a polished bar 66 extending upwardly through the interior of a casting 67 mounted on the front of the head 41. The bar 66 is retained in any vertical position to which it is moved by engagement with a cam 68 urged against its side by a locking lever 69, the cam 68 and the lever 69 being fixedly mounted on a common cam shaft 70. The saw guard and guide 65 is moved up and down by finger pressure on a handle 71 fixed to the bar 66 which is prevented from moving downwardly too far by a stop stud 72 set in the forward side of the bar near its upper end and which engages the top of the casting 67 when the saw guard and guide 65 is moved downwardly to the limit of its travel. The saw guard itself includes a vertically extending channel member 73 enclosing the saw blade and carried by the bar 66, movable therewith and extending upwardly through an opening in the front wall of the head 41. The new guide itself includes a small casting 74 located within the bottom part of the member 73 and attached to the bottom of the bar 66 and movable therewith. The casting 74 supports a thrust ball bearing 75 mounted on an eccentric ball bearing stud 76, which bearing is adjustable toward and away from the back of the saw blade 13 by turning the eccentric stud. In adjusted position, the back of the saw blade 13 is vertically tangent to the thrust bearing 75 which provides backing means for the blade.

In order to properly guide the saw blade 13 beneath the piece of meat being cut, there is provided a removably mounted and adjustable lower saw guide 77 (Figures II, III, IV and V). The lower saw guide 77 includes a thrust ball bearing 78 mounted on an eccentric ball bearing stud 79, the bearing and the stud being substantially identical with the corresponding parts 75 and 76 of the upper saw guide 65, the function and operation of which have been hereinbefore described. The ball bearing stud 79 is mounted on the side of a stationary table support 80, to be hereinafter described in detail, attached to the top of the Z-shaped section 21 of the base housing 1.

Just before the back of the downwardly running saw blade 13 contacts the thrust bearing 78, the blade passes through a slot 81, shown in full in Figure VI, part of which is cut through a saw guide plate 82 carried by a bracket 83 (Figure III) fixed to the side of the stationary table support 80 and part of which is cut through a saw guide block 84 carried by a second bracket 85 also fixed to the side of the stationary table support 80. A spacer 86 (Figure IV) of suitable thickness is interposed between the saw guide block 84 and the side of the stationary table support 80 to properly align that part of the slot 81 cut in the saw guide block 84 with the saw blade 13. Just after the downwardly running saw blade 13 passes by the thrust bearing 78, the blade passes between a pair of thin flexible bladed scrapers 87, preferably made of molded nylon, so adjustably mounted on a small casting 88 attached to the inside wall 23 of the Z-shaped section 21 of the base housing 11 that their upper ends are bent inwardly to scrape opposite sides of the blade 13 passing therebetween. By unscrewing a pair of thumbscrews 89, the casting 88 and the scrapers 87 can be removed as a unit assembly. Similarly, by unscrewing a thumbscrew 90, the thrust ball bearing 78 can be removed from the ball bearing stud 79.

The two blade scrapers 87 remove a considerable portion of the grease and fatty matter which adheres to the saw blade 13 after it passes through the meat, but they cannot remove all of the fat and grease and a considerable quantity of this material is transferred to the peripheries of the upper and lower saw wheels 11 and 12. It is necessary, therefore, to provide the upper wheel scraper 61, hereinbefore described, and a lower wheel scraper 91 (Figure I). The lower wheel scraper 91 includes a bracket 92 attached to the inside wall 23 of the Z-shaped section 21 of the base housing 1 and a thin flexible blade 93, similar to the blade 64 of the upper wheel scraper 61, so adjustably mounted on the bracket 92 that its lower end is forced against the periphery of the lower saw wheel 12. A second thin flexible blade 94 is also attached to the bracket 92 and is so positioned that the end of the blade 94 scrapes the inside of the rearward stretch of the saw blade 13 as it passes by. Another bracket 95 (Figure I), similar to the bracket 92, is also attached to the inside wall 23 of the Z-shaped section 21 of the base housing 1 and a thin flexible blade 96, similar to the blades 93 and 94, is so adjustably mounted on the bracket 95 that its lower end scrapes the outside of the rearward stretch of the saw blade 13 as it passes by.

One of the features of the improved meat cutting band saw contributing to its very low cost is the construction of the movable table 7 and the support therefor. The movable table 7 supports the main piece of meat to be cut in such a manner as to enable it to be moved past the saw blade 13. The table 7 includes a plate 97 (Figure VI) having an upturned front portion 98 (Figure VII) against which the meat to be cut may rest and a pair of wheel support brackets 99 fixed to its underneath side. The movable table 7 rides on four wheels 100 formed by ball bearings mounted two on each of a pair of axles 101 extending between the wheel support brackets 99, the wheels 100 being spaced from the brackets 99 by washers 102 and spaced from each other on the axles 101 by spacers 103. A fixed table stop 104 is attached to the left hand wheel support bracket 99, as viewed in Figure VII, and extends downwardly below the bracket.

The movable table 7 travels across the machine on the pair of tracks 6 carried by the supporting bracket members 4. The tracks 6 include a channel member 105 attached to the bracket members 4, as best shown in Figure VI, and having one edge bent into a horizontally extending, track-like shelf 106 and its other edge supporting a flat surfaced bar 107 extending generally horizontal and parallel to the shelf 106. Two of the wheels 100 have flat rims 108 cooperating with the shelf 106 and the other wheels 100 have double flanged rims 109 cooperating with the flat surfaced bar 107. The double flanged rims 109 function to prevent yawing movement of the movable table 7 as it travels across the machine, thus preventing binding of the table. The wheel support brackets 99 in addition to providing means for mounting the wheels 100 also have their free ends 110 bent to extend underneath the tracks 6 limiting rising movement of the movable table 7.

The construction of the movable table 7 and the support therefor permits the use of low cost materials which nevertheless produce an improved easily movable and non-binding table. It is, of course, desirable that the wheels 100 of the table be so guided as to move in a perfectly horizontal and parallel path. However, it is impossible to mass produce the movable table 7 and its support from low cost sheet metal sections of perfectly straight and aligned construction. The movable table 7 is therefore self-adjustably supported, as best shown in Figure VII, so that as the double flanged rims 109 follow the bar 107 any movement of the table 7 transverse to a straight path of movement across the machine is permitted by the flat rims 108 which can slide sidewise on the shelf 106. Also, any up or down movement of the table 7 caused by slight dips in the shelf 106 or in the bar 107 is permitted by the open relationship of the free ends 110 of the brackets 99 with the tracks 6.

Travel of the table 7 on its tracks 6 is limited by L-shaped rockable table stops 111 (Figures VI and VII) mounted on an edge of the channel member 105, the rockable table stops 111 being located adjacent plates 112 (Figure VI) fixed to the edge of the channel member 105. When the rockable tables stops 111 are turned to their upright positions, as best shown in Figure VII, the tops of the L-shaped rockable stops 111 obstruct the path of the fixed table stop 104 attached to the left hand wheel support bracket 99. At the same time, the L-shaped rockable stops 111, as shown in Figure VI, are prevented from being turned past their upright positions through contact of the fixed table stop 104 by the adjacent fixed plates 112. However, the fixed plates 112 do not prevent clockwise rotation of the left hand (as viewed in Figure VI) rockable table stop 111 or counterclockwise rotation of the right hand rockable table stop 111 by finger pressure. Travel of the table 7 on its tracks 6 from the position shown in solid lines in Figure VI to the position shown in broken lines in Figure VI permits a full sweep of any meat carried on the table 7 past the saw blade 13. Travel of the table is limited by the L-shaped rockable table stops 111 in their upright positions. When the table stops 111 are pivoted from their upright positions to horizontal positions by finger pressure, the path of the fixed table stop 104 is no longer obstructed and the table 7 can be removed from its tracks 6.

In order to enable the cutting of pieces of meat in uniform thickness the machine is equipped with the thickness gauge plate 17 (Figures I and II) which is adjustable back of the cutting plane of the saw blade 13 is a selected distance up to a predetermined maximum. The thickness gauge plate 17 consists of a vertical plate 113 which extends upwardly from a tubular slide 114 slidably mounted upon a guide rod 115 which extends from the front to the rear of the machine parallel and adjacent to the right edge of the stationary table 8. The rod 115 is mounted on a pair of arms 116 extending to the right some distance beyond the edge of the stationary table 8 and carried by a long L-shaped bracket 117 fixed as by welding to the stationary table support 80, as best shown in Figure II. The slide 114 has a downwardly extending finger 118 which is engageable behind a lug formed on the side and at the rear of an elongated nut 119 which is threaded on a shaft 120 rotatably mounted in the arms 116 parallel to and slightly outside and below the guide rod 115. The nut 119 has an upwardly extending arm 121 which also is slidably mounted on the guide rod 115 and which, when the finger 118 is engaged behind the lug on the nut 119, engages the front end of the slide 114. The shaft 120 extends through the front one of the arms 116 where it is normally connected by means of a collar 122 to a second shaft 123 rotatably mounted through the channel member 105. A hand crank 124 is pinned on the front end of the second shaft 123. When the collar 122 is drivingly connected to the shaft 120 and when it is rotated, it rotates the shaft 120 and this in turn shifts the elongated nut 119. With the gauge plate slide 114 engaged between the lug on the nut 119 and the arm 121 of the nut the gauge plate 17 also is shifted. Thus, by rotating the hand crank 124 the position of the thickness gauge plate 17 can be selectively varied at will relative to the cutting plane of the saw blade 13.

Normally the collar 12 is forced into locking engagement with the end of the shaft 120 by a spring 125 surrounding the end of the second shaft 123 remote from the hand crank 124 and compressed between the collar 122 and the side of the channel member 105 (Figure I). When the band saw blade 13 is replaced or removed, the second shaft 123 is pulled into the position illustrated in Figure I and turned to engage a pin 126 protruding from the shaft 123 with a lock piece 127 attached to the bottom of the channel member 105. The saw blade 13 is then passed between the collar 122 and the end of the shaft 120, the second shaft 123 is turned to disengage the pin 126 from the lock piece 127 and the spring 125 then again forces the collar into normal locking engagement with the end of the shaft 120.

When it is desired to cut up large pieces of meat and, therefore, the gauge plate 17 must be transplaced to the rear of the machine to clear the throat so that the large piece of meat can be moved therethrough, the gauge plate can be operatively disconnected from the nut 119 by tilting it bodily in a clockwise direction (from the front of the machine as shown in Figure II) or outwardly as shown in Figure I to disengage the finger 118 from back of the lug on the nut 119. The gauge plate 17 can then be slid the length of the guide rod 115 to the rear of the machine. If it is then desired to return the gauge plate 17 to the same position at which it was located before being removed, it can be merely slid forward until the front end of the slide 114 engages the arm 121 on the nut 119 and then swung to its operative position. This returns the gauge plate to the same position back of the saw blade as it was before being moved without requiring tedious adjustment of the position of the nut 119 by the hand crank 124.

Another of the features of the improved meat cutting band saw contributing to its very low cost is the construction of the column 9 and the support therefor. Heretofore, meat cutting band saws had expensive cast columns integral with the main frame of the head of the upper saw wheel housing. The column was supported on an expensive casting which was a part of the base housing. The present column 9 is made separate from the saw wheel housing 10, the column being made from flat stock by bending and having a welded seam. The process of bending flat stock is more economical than forming the column integral with the saw wheel housing by casting. Furthermore, the size and weight of the column 9 and the saw wheel housing 10 is sufficiently reduced to facilitate handling during assembly of the machine, as well as to reduce the space required for storing the units in order to maintain the necessary inventory of parts. Also, instead of supporting the present column from an expensive casting which is a part of the base housing, the present column 9 is cleverly supported from the low cost sheet metal sections of the base housing 1 itself. Furthermore, the present column 9, although made of economical flat stock by a low cost bending process, supports the saw wheel housing 10 in an extremely rigid manner, the column 9 and its support having very great strength.

The column 9, shown in detail in Figures VIII, IX and X, has a hollow vertically upstanding body 128 having open ends 129, whereby it may be made from flat stock by bending. The lower end 129 of the column 9 is covered, at least in part, by a plate 130 fixed as by welding to the lower edges of the body 128 of the column. A pair of pins 131 fixed to the plate 130 function as means for locating the plate 130 relative to the column 9 to facilitate assembly, the pins 131 cooperating with diagonally opposite, inside corners of the lower end of the column.

The column 9 is erected from the base housing 1, the lower rear end of the column and the back of the plate 130 fixed thereto being welded to the back plate 25 of the base housing 1, as shown in Figure I, and the lower front and the lower left hand side and the bottom of the column being welded in an L-shaped in plan opening 132 cut in the Z-shaped section 21 of the base housing 1, as best shown in Figure VI.

An even stronger and more rigid mounting of the column can be effected, as illustrated in Figure XVIII. In this modification, a column 9a has a section cut from its lower front and side walls leaving a bottom part 133 of the rear wall of the column 9a extending below a plate 130a corresponding to the plate 130, hereinbefore described. In this modification, it is not necessary to cut an opening in the Z-shaped section of the base housing as is done for mounting the column 9. The plate 130a is attached to the top of a Z-shaped section 21a corresponding to the Z-shaped section 21 of the base housing 1 and the bottom part 133 of the rear wall of the column 9a is attached to a back plate 25a corresponding to the back plate 25 of the base housing 1.

The head 41 of the saw wheel housing 10 is attached to the upper end of the column 9 by anchoring means comprising a head stay or anchoring rod 134 (Figures VIII to X) fixed to the plate 130 and extending upwardly through the column. The upper end of the anchoring rod 134 is threaded and extends through an opening in a boss 135 on the inside of the head 41. A nut 136 retains the head 41 in place and a pair of pins 137 fixed to the head 41 of the saw wheel housing 10 tightly cooperates with diagonally opposite, inside corners of the upper end of the column 9 for preventing movement of the saw wheel housing 10 relative to the column, especially twisting movement. The pins 137 also perform the additional function of locating the head 41 relative to the column 9 to facilitate assembly.

The saw guard 14 is fixed to the column 9 between the saw wheel housing 10 and the base housing 1 to enclose the rearward stretch of the band saw 13 extending therebetween. The saw guard 14 is protectively wrapped around the band saw 13 and may have a shape in plan as shown in Figure IX.

The unique mounting of the head 41 of the saw wheel housing 10 upon the column 9 by the anchoring means which includes the plate 130 and the anchoring rod 134 provides a simple low cost mounting having extreme rigidity, since the head 41 is supported by the top of the column and is also tied down to the bottom of the column. The mounting may be modified in various ways, the preferred of which are illustrated in Figures XI–XVIII.

Figures XI and XII illustrate a column 9b having its lower open end covered by a plate 130b fixed to the lower edges of the body of the column. An anchoring rod 134b is fixed to the plate 130b and extends upwardly through the column 9b. In this modification, the means for locating the plate 130b of the anchoring means relative to the lower end of the column includes raised portions 138 cooperating with the inner surface of the lower end of the column 9b. Holes 139 in the raised portions 138 may be used in erecting the column 9b from a base housing.

Figures XIII and XIV illustrate a column 9c having a head 41c of a saw wheel housing attached to the upper end of the column by anchoring means comprising an anchoring rod 134c extending upwardly through the column. In this modification, a nut 136c forced against a boss 135c on the inside of the head 41c retains the head in place and a member 140, tightly cooperating with the inner surface of the upper end of the column and with the inner surface of the lower end of the head 41c, prevents movement of the head relative to the column. The member 140 also performs the additional function of locating the head 41c relative to the column 9c to facilitate assembly.

Figures XV and XVI illustrate a column 9d having a head 41d of a saw wheel housing attached to the upper end of the column by anchoring means comprising an anchoring rod 134d extending upwardly through the column. In this modification, a nut 136d forced against a boss 135d on the inside of the head 41d retains the head in place and a member 141 fixed to the head as by welding and fixed to the inside of the column 9d at points 142 contacts the inner surfaces of the upper end of the column at a plurality of spaced apart points and prevents movement of the head relative to the column. The member 141 also performs the additional function of locating the head 41d relative to the column 9d to facilitate assembly.

Figure XVII illustrates a modification of the member 141. In this modification, to eliminate the possibility of bowing out the column 9d (Figure XVI) at points 143 by twisting force imparted by the head 41d, a member 141a fixed to a head of a saw wheel housing contacts the inner surfaces of the upper end of a column 9e at eight spaced apart points 144 and prevents movement of the head relative to the column 9e.

Still another of the features of the improved meat cutting band saw contributing to its very low cost is the construction of the improved stationary table 8 and the support therefor. Although both the table and its support are made from economical flat stock by a low cost bending process, the table is very easily removable and positionable on its support and is so shaped as to permit easy removal and replacement of the band saw blade 13. The stationary table 8, illustrated in detail in Figures XIX–XXIII, overlies the base housing 1 and forms a flat top on the housing.

The stationary table 8 includes a plate 145, preferably of stainless steel or other smooth durably finished material, having an opening 146 around which is attached an upstanding shield 147 enclosing the front and sides of the column 9 and the rearward stretch of the saw blade 13, but spaced apart therefrom. When the saw blade 13 is replaced, the collar 122 is disengaged from the end of the shaft 120, as shown in Figure I and as hereinbefore described, the access door 18 of the base housing 1 is opened, the cover 42 on the saw wheel housing 10 is opened, and the top of the saw blade is placed around the periphery of the upper saw wheel 11, the saw wheel 11 being in lowered position, the forward stretch of the saw blade is passed between the collar 122 and the end of the shaft 120, the bottom of the saw blade is placed around the periphery of the lower saw wheel 12 and the rearward stretch of the saw blade is passed around the back of the stationary table 8 and through the opening 146 in the table 8. This method of replacing or, when reversed, removing the saw blade 13 is very easy and requires a minimum number of movements on the part of the operator.

The stationary table 8 is supported by the table support 80 carried by the top of the Z-shaped section 21 of the base housing 1, the table support 80 including a channel member frame 148 having two upstanding sides and a pair of L-shaped brackets 149 fixed to the upstanding sides by cap screws 150, one of which is shown in Figure XXIII, and extending along each of the upstanding sides, upon which brackets 149 the plate 145 of the table 8 bears. A plurality of clips 151 are attached to the underneath side of the table 8 and engage a portion of one of the brackets 149 to hold the table down and adjustable thrust screws 152, locked in place by lock nuts 153, extending through that one of the brackets 149 engaging the clips cooperate with the clips for positioning the table relative to the channel member frame 148. After the table 8 is properly positioned by the thrust screws 152, the table is locked to the top of the Z-shaped section 21 of the base housing 1 by hold down means comprising a hold down clip 154 fixed to the underneath side of the table and a thumb screw 155 extending through a hole in the hold down clip and threaded into the top of the Z-shaped section 21 of the base housing 1. To remove the table 8 from the machine, the thumb screw 155 is loosened, the clips 151 disengaged from the bracket 149 and the table 8 lifted from its place.

A modification of the stationary table 8 and the support therefor is illustrated in Figures XXIV–XXVIII. This table has all the advantages of the table 8 hereinbefore described and in addition has adjusting means for leveling the table 8 when the low cost, mass-produced sheet metal sections from which the table and the support therefor are made are not properly in alignment with each other.

A modified stationary table 8a includes a plate 145a having an opening 146a around which is attached an upstanding shield 147a. The table 8a is supported by a table support 80a comprising a channel member frame 148a having two upstanding sides. A plurality of clips 151a are attached to the underneath side of the table 8a and cooperate with openings 156 in one of the upstanding sides of the frame 148a to hold the table down. A plurality of circularly shaped members 157 are adjustably and eccentrically mounted along the upstanding sides of the frame 148a and support the front and back edges of the table 8a. When the table 8a is to be attached to the machine, the clips 151a are inserted in their cooperating openings 156 in the frame 148a and a pair of adjustable thrust screws 152a, threaded through the frame 148a and locked in place by lock nuts 153a, are adjusted to position the table relative to the table support 80a. The circularly shaped and eccentrically mounted members 157 are then turned by means of a tool (not shown) inserted in holes 158, one of which is shown in Figure XXVIII, to level the table 8a to accommodate poorly aligned parts. Thus, even if the plate 145a of the table 8a or if the channel member frame 148a happens to be crooked, compensation for the poor alignment can be made by leveling the table by means of the eccentrically mounted members 157. After the table 8a is properly positioned by the thrust screws 152a and leveled by the eccentrically mounted members 157, the table is locked to the top of a Z-shaped section 21a of a base housing by hold down means comprising a hold down clip 154a fixed to the underneath side of the table and a thumb screw 155a extending through a hole in the hold down clip and threaded into the top of the Z-shaped section 21a.

The embodiments of the invention that have been disclosed may be modified to meet various requirements.

Having described the invention, I claim:

1. In a meat cutting band saw, in combination, a base housing, a hollow vertically upstanding column erected from the base housing, the column having open ends whereby it may be made from flat stock by bending, a detachable saw wheel housing attached to the column enclosing the upper open end of the column, means for preventing twisting movement of the saw wheel housing relative to the column, an upper saw wheel rotatably mounted in the saw wheel housing, a lower saw wheel rotatably mounted in the base housing, a continuous band saw blade running on the saw wheels outside of the column, and a saw guard fixed to the column between the saw wheel housing and the base housing to enclose the rearward stretch of the band saw extending therebetween.

2. In a meat cutting band saw, in combination, a base housing, a hollow vertically upstanding column having open ends erected from the base housing, anchoring means fixed to the lower end of the column and extending upwardly therethrough, a saw wheel housing attached to the upper end of the column by the anchoring means, means for preventing movement of the saw wheel housing relative to the column, an upper saw wheel rotatably mounted in the saw wheel housing, a lower saw wheel rotatably mounted in the base housing, a continuous band saw blade running on the saw wheels, and a saw guard fixed to the column between the saw wheel housing and the base housing to enclose the rearward stretch of the band saw extending therebetween.

3. A combination according to claim 2 having means for locating the anchoring means relative to the lower end of the column.

4. A combination according to claim 3 wherein the means for locating the anchoring means includes a pair of pins fixed to the anchoring means and cooperating with diagonally opposite corners of the lower end of the column.

5. A combination according to claim 3 wherein the means for locating the anchoring means includes at least one raised portion on the anchoring means cooperating with the inner surface of the lower end of the column.

6. In a meat cutting band saw, in combination, a base housing, a hollow vertically upstanding column having open ends erected from the base housing, anchoring means fixed to the lower end of the column and extending upwardly therethrough, the rear wall of the column extending below the anchoring means for attachment to the base housing, a saw wheel housing attached to the upper end of the column by the anchoring means, means for preventing movement of the saw wheel housing relative to the column, an upper saw wheel rotatably mounted in the saw wheel housing, a lower saw wheel rotatably mounted in the base housing, a continuous band saw blade running on the saw wheels, and a saw guard fixed to the column between the saw wheel housing and the base housing to enclose the rearward stretch of the band saw extending therebetween.

7. In a meat cutting band saw, in combination, a base housing, a hollow vertically upstanding column erected on the base housing, the column having open ends whereby it may be made from flat stock by bending, a plate fixed to the lower end of the column and covering at least part of the lower open end of the column, an anchoring rod fixed to the plate and extending upwardly through the column, a saw wheel housing attached to the upper end of the column by the anchoring rod, means for preventing movement of the saw wheel housing relative to the column, an upper saw wheel rotatably mounted in the saw wheel housing, a lower saw wheel rotatably mounted in the base housing, a continuous band saw blade running on the saw wheels, and a saw guard fixed to the column between the saw wheel housing and the base housing to enclose the rearward stretch of the band saw extending therebetween.

8. A combination according to claim 7 wherein the means for preventing movement of the saw wheel housing relative to the column includes a pair of pins fixed to the saw wheel housing and cooperating with diagonally opposite corners of the upper end of the column.

9. A combination according to claim 7 wherein the means for preventing movement of the saw wheel housing relative to the column includes a tapered member cooperating with the inner surface of the upper end of the column and with the inner surface of the lower end of the saw wheel housing.

10. A combination according to claim 7 wherein the means for preventing movement of the saw wheel housing relative to the column includes a member fixed to the saw wheel housing and to the upper end of the column, the member contacting the inner surfaces of the upper end of the column at a plurality of spaced apart points.

11. In a meat cutting band saw, in combination, a base housing, a hollow vertically upstanding column erected on the base housing, the column having open ends whereby it may be made from flat stock by bending, a plate fixed to the lower end of the column and covering at least part of the lower open end of the column, means for locating the plate relative to the column, an anchoring rod fixed to the plate and extending upwardly through the column, a saw wheel housing attached to the upper end of the column by the anchoring rod, means for preventing movement of the saw wheel housing relative to the column, an upper saw wheel rotatably mounted in the saw wheel housing, a lower saw wheel rotatably mounted in the base housing, a continuous band saw blade running on the saw wheels, and a saw guard fixed to the column between the saw wheel housing and the base housing to enclose the rearward stretch of the band saw extending therebetween.

12. A combination according to claim 11 wherein the means for locating the plate relative to the column includes a pair of pins fixed to the plate and cooperating with diagonally opposite corners of the lower end of the column.

13. A combination according to claim 11 wherein the means for locating the plate relative to the column includes at least one raised portion on the plate cooperating with the inner surface of the lower end of the column.

References Cited in the file of this patent

UNITED STATES PATENTS

| | | |
|---|---|---|
| 1,803,489 | Schueren | May 5, 1931 |
| 1,848,300 | Avilla | Mar. 8, 1932 |
| 1,870,774 | Gaines | Aug. 9, 1932 |
| 1,959,184 | Walker | May 15, 1934 |
| 1,965,310 | Freeman et al. | July 3, 1934 |
| 2,059,595 | McKeage | Nov. 3, 1936 |
| 2,329,345 | Gardner | Sept 14, 1943 |
| 2,435,765 | Anderson | Feb. 10, 1948 |
| 2,492,824 | Ahrndt et al. | Dec. 27, 1949 |
| 2,585,957 | Meeker et al. | Feb. 19, 1952 |
| 2,617,451 | Fink et al. | Nov. 11, 1952 |
| 2,627,881 | Houtte et al. | Feb. 10, 1953 |
| 2,664,118 | Krumbach | Dec. 29, 1953 |
| 2,695,637 | Ocenasek | Nov. 30, 1954 |

FOREIGN PATENTS

| | | |
|---|---|---|
| 93,869 | Switzerland | Apr. 1, 1922 |

UNITED STATES PATENT OFFICE
CERTIFICATE OF CORRECTION

Patent No. 2,814,318                                November 26, 1957

James D. Brown

It is hereby certified that error appears in the printed specification of the above numbered patent requiring correction and that the said Letters Patent should read as corrected below.

Column 5, line 22, for "adjusting" read -- adjustably --; line 54, for "new" read -- saw --; column 6, line 18, for "base housing 11" read -- base housing 1 --; column 7, line 58, for "saw blade 13 is a" read -- saw blade 13 a --; column 8, line 17, for "collar 12" read -- collar 122 --; column 9, line 6, before "end" insert -- open --.

Signed and sealed this 30th day of December 1958.

(SEAL)
Attest:

KARL H. AXLINE
Attesting Officer

ROBERT C. WATSON
Commissioner of Patents